United States Patent [19]

Shepard, Jr.

[11] 3,725,447
[45] Apr. 3, 1973

[54] LEAD FLUOROBORATES AS REDISTRIBUTION CATALYSTS

[75] Inventor: John C. Shepard, Jr., Freeport, Tex.

[73] Assignee: Nalco Chemical Company, Chicago, Ill.

[22] Filed: Sept. 23, 1971

[21] Appl. No.: 183,228

[52] U.S. Cl. ............................................. 260/437 R
[51] Int. Cl. ................................................. C07f 7/24
[58] Field of Search ................................. 260/437 R

[56] References Cited

UNITED STATES PATENTS 3,151,141  9/1964  Arimota ............................. 260/437 R
3,527,780  9/1970  Williamson ........................ 260/437 R

OTHER PUBLICATIONS

J. Organometal. Chem. 6 (1966) pg. 363.

*Primary Examiner*—Helen M. S. Sneed
*Attorney*—John G. Premo et al.

[57] ABSTRACT

A process for the redistribution of alkyl radicals in tetra alkyl lead compositions by using as a catalyst a trialkyl lead fluoroborate. Also there is shown a new method for preparing trialkyl lead fluoroborates.

4 Claims, No Drawings

LEAD FLUOROBORATES AS REDISTRIBUTION CATALYSTS

INTRODUCTION

This invention relates to the redistribution of the alkyl radicals in tetra alkyl lead compounds. More specifically, this invention relates to the redistribution of tetra methyl lead and tetra ethyl lead by use of a trialkyl lead fluoroborate catalyst.

This redistribution process between alkyl lead radicals is well known to the art and may be carried out in the presence of various catalysts. The redistribution of organic groups between two different tetra alkyl lead compounds occurs in a random manner to produce a statistical distribution of all five possible tetraorgano lead derivatives based on the relative concentration of the two alkyl lead compounds. This reaction can be described by the following equation:

where:
R and R' are different straight or branched chain alkyl radicals.

A catalyst is required to effect the redistribution reaction between tetraorgano lead compounds. Effective catalysts are Lewis acid compounds such as zinc chloride, zinc fluoride, mercury (II) chloride boron trifluoride, aluminum chloride, aluminum bromide, and dimethyl aluminum chloride as well as zirconium (IV) chloride, tin (IV) chloride and triethyl lead chloride, triethyl lead iodide, phosphorous trichloride, arsenic trichloride, bismuth trichloride, iron (III) chloride, and platinum (IV) chloride. Activated alumina and other metal oxides are also effective redistribution catalysts.

The redistribution reaction and catalysts therefore are described in greater detail in 62 JACS (1940) pages 1099–1104 and in the volume ORGANIC COMPOUNDS OF LEAD by Shapiro and Frey, published by John Wiley and Sons, 1968. While a number of catalysts are mentioned in these two references as well as in several U.S. Pat. Nos., including 2,270,108 and 3,151,141 all seem to be unsatisfactory for various reasons one of which is the lack of thermal stability. Also, these catalysts often form undesirable side products and require a water wash subsequent to the reaction. In the present invention the use of the trialkyl lead fluoroborate catalysts prevents the formation of these side products thereby eliminating the need for water washing. It further has been discovered that the use of a trialkyl lead fluoroborate catalyst in the redistribution reaction of tetra alkyl radicals results in a rapid reaction with little, if any, thermal instability of the catalyst being observed.

OBJECTS

Therefore, it is an object of this invention to provide catalysts for the redistribution of alkyl radicals in tetra alkyl lead compounds.

It is a further object of this invention to provide catalysts for the redistribution of alkyl radicals in tetra alkyl lead compounds, said reaction proceeding quickly without unwanted side effects.

A further object is to provide a trialkyl lead fluoroborate catalyst to redistribute the alkyl radicals in a tetra alkyl lead compound.

A still further object is to provide a method of making trialkyl lead fluoroborates.

THE INVENTION

This invention involves the redistribution of alkyl radicals in tetra alkyl lead compounds by the use of a trialkyl lead fluoroborate catalyst. Secondly, this invention involves a method of making trialkyl lead fluoroborate. Generally, the trialkyl lead fluoroborate catalyst is dissolved in water in a concentration of approximately 75 percent by weight; other concentrations ranging from 50 to 75 percent by weight also may be employed. The aqueous solution of the trialkyl lead fluoroborate is added to the tetra alkyl lead mixture, such that the concentration of catalyst is from 10 to 50 percent based on the weight of alkyl lead mixture. The preferred concentration is from 20 to 33 percent by weight. The redistribution occurs rapidly at ambient temperature and pressure. No external heating or cooling is necessary and there is no thermal instability of the tetra alkyl lead mixture or the catalyst.

The reaction should be conducted with good agitation. The reaction is complete within from 1 to 8 hours dependent upon the efficiency of the mixing technique used. While room temperature is preferred, other temperatures ranging from 40° F. up to about 160° F. may be used although no advantage is achieved above or below room temperature.

Typical tetra alkyl lead compounds which may be used in the practice of this invention are tetra methyl lead and tetra ethyl lead.

THE TRIALKYL LEAD FLUOROBORATE

Trialkyl lead fluoroborates may be described by the following formula:

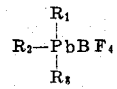

where:
$R_1$, $R_2$ and $R_3$ are straight or branched chain aliphatic hydrocarbons having from 1 to 6 carbon atoms.

The preferred trialkyl lead fluoroborate of this invention is trimethyl lead fluoroborate.

The trialkyl lead fluoroborate is produced by the reaction of a tetra alkyl lead with borofluoric acid:

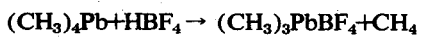

The reaction is conducted by utilizing aqueous solutions of borofluoric acid to which is added the tetra alkyl lead compound. The concentration of the borofluoric acid solutions may vary from as little as 1% up to its saturation solubility. The reactions are normally conducted at room temperature and are usually completed in from 2 to 3 hours.

The trialkyl lead fluoroborate solutions produced by the method described above may be concentrated by evaporation of water to produce solutions having concentrations within the range of from 5 to about 75 percent by weight.

The following examples are given to illustrate the invention.

EXAMPLE I

To 450 grams of an equal molar mixture of tetra methyl lead and tetra ethyl lead, 200 grams of a 75% aqueous solution of tri-methyl lead fluoroborate is added. The reaction proceeds with stirring at room temperature for four hours. There is no formations of side products and therefore no water wash of the mixture is needed. Analysis of the redistributed mixture was found to be as follows:

| Tetra Alkyl Lead | Mole Percent |
|---|---|
| tetra methyl | 5.1 |
| trimethyl ethyl | 23.6 |
| dimethyl ethyl | 42.3 |
| methyl triethyl | 23.6 |
| tetra ethyl | 5.4 |

It is well known that by changing the proportions of a mixture of alkyl lead compounds one obtains different proportions of products in the distribution mixture. The present invention can be employed in carrying out the redistribution of alkyl groups in mixtures of any proportions. In place of the 50:50 molar mixture used in the above example there may be used other mixtures such as those composed of 25:75 mole percent of tetra methyl lead and 75:25 mole percent of tetra ethyl lead to produce equilibrium redistribution mixtures useful as anti-knock agents. Likewise, the catalyst of this invention effects redistribution of alkyl groups in an alkyl lead which contains at least two different alkyl groups in the molecule, such as dimethyl diethyl lead, monothyltriethyl lead, etc. The resulting effect is the same as if two different alkyl leads were used in proportion, providing the same number of different alkyl groups.

EXAMPLE II

One hundred fifty grams of tetra methyl lead and 100 grams of 48 percent borofluoric acid aqueous solution are added to a reaction vessel and stirred two hours at room temperature at which time the reaction has proceeded to completion. This product is isolated and then is ready to be used in the redistribution reaction as described in Example I.

I claim:

1. A process for the redistribution of alkyl radicals in tetra alkyl lead compositions containing at least two different alkyl radicals, from the group consisting of methyl and ethyl radicals, which comprises contacting said alkyl lead composition with from 10 to 50 percent of a trialkyl lead fluoroborate by weight of the alkyl lead mixture.

2. A process for the redistribution of alkyl radicals in tetra alkyl lead compositions containing at least two different alkyl radicals, from the group consisting of methyl and ethyl radicals, which comprises contacting said alkyl lead composition with trialkyl lead fluoroborate having a concentration of from 20 to 33 percent by weight of alkyl lead mixture.

3. The process of claim 1 wherein the trialkyl lead fluoroborate is trimethyl lead fluoroborate.

4. A process for the redistribution of methyl and ethyl radicals in a tetra methyl lead and tetra ethyl lead mixture wherein the said mixture is contacted with from 20 to 33 percent of trimethyl lead fluoroborate by weight of the mixture.

* * * * *